United States Patent
Rao et al.

(10) Patent No.: US 8,142,164 B2
(45) Date of Patent: Mar. 27, 2012

(54) ROTOR BLADE FOR USE WITH A WIND TURBINE AND METHOD FOR ASSEMBLING ROTOR BLADE

(75) Inventors: Kavala Venkateswara Rao, Andhra Pradesh (IN); Mohamad Sultan, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 12/651,156

(22) Filed: Dec. 31, 2009

(65) Prior Publication Data

US 2011/0135487 A1 Jun. 9, 2011

(51) Int. Cl.
*F03D 11/00* (2006.01)
(52) U.S. Cl. ............... 416/226; 416/232; 29/889.71
(58) Field of Classification Search ............ 416/233, 416/232, 226; 29/889.71
See application file for complete search history.

(56) References Cited

U.S. PATENT DOCUMENTS

| | | | | |
|---|---|---|---|---|
| 2,326,430 A | * | 8/1943 | Blanchard | 269/254 R |
| 2,412,908 A | * | 12/1946 | Platt et al. | 416/226 |
| 2,460,351 A | * | 2/1949 | Hoffman et al. | 416/145 |
| 2,461,351 A | * | 2/1949 | Silverman | 73/861.75 |
| 4,260,332 A | | 4/1981 | Weingart et al. | |
| 4,295,790 A | | 10/1981 | Eggert, Jr. | |
| 4,339,230 A | | 7/1982 | Hill | |
| 4,692,095 A | | 9/1987 | Lawson-Tancred | |
| 4,728,263 A | * | 3/1988 | Basso | 416/226 |
| 4,739,954 A | * | 4/1988 | Hamilton | 244/123.1 |
| 4,863,117 A | * | 9/1989 | Riout | 244/48 |
| 4,976,587 A | | 12/1990 | Johnston et al. | |
| 7,198,471 B2 | | 4/2007 | Gunneskov et al. | |
| 7,377,752 B2 | | 5/2008 | Mohamed | |
| 2004/0253114 A1 | | 12/2004 | Gunneskov et al. | |
| 2005/0180854 A1 | | 8/2005 | Grabau et al. | |
| 2005/0186081 A1 | | 8/2005 | Mohamed | |
| 2006/0225278 A1 | | 10/2006 | Lin et al. | |
| 2007/0040294 A1 | | 2/2007 | Arelt | |
| 2007/0189902 A1 | | 8/2007 | Mohamed | |
| 2007/0189903 A1 | | 8/2007 | Eyb | |
| 2007/0251090 A1 | | 11/2007 | Breugel et al. | |
| 2008/0107540 A1 | | 5/2008 | Bonnet | |
| 2009/0068017 A1 | | 3/2009 | Rudling | |
| 2009/0196756 A1 | | 8/2009 | Althoff | |

FOREIGN PATENT DOCUMENTS

| | | |
|---|---|---|
| EP | 0011330 A1 | 5/1980 |
| GB | 1544010 | 4/1979 |
| GB | 2254382 A | 7/1992 |
| WO | 03078833 A1 | 9/2003 |
| WO | 2004078465 A1 | 9/2004 |
| WO | 2008039076 A1 | 4/2008 |

* cited by examiner

*Primary Examiner* — Ninh H Nguyen
(74) *Attorney, Agent, or Firm* — James McGinness, Esq.; Armstrong Teasdale LLP (57) ABSTRACT

A method for assembling a rotor blade for use with a wind turbine. The method includes providing a blade sidewall at least partially defining a cavity extending from a blade root towards a blade tip of the rotor blade, the blade sidewall having a leading edge and a trailing edge. A structural support assembly is positioned at least partially within the cavity and extends from the blade root towards the blade tip. The structural support assembly includes a root end and an opposing tip end. At least one support member is coupled to the blade sidewall and to the structural support assembly.

18 Claims, 7 Drawing Sheets

ROTOR BLADE FOR USE WITH A WIND TURBINE AND METHOD FOR ASSEMBLING ROTOR BLADE

BACKGROUND OF THE INVENTION

The subject matter described herein relates generally to wind turbines and, more particularly, to rotor blades for use with a wind turbine.

At least some known wind turbine rotor blades include two blade shell portions of fiber reinforced polymer. The blade shell portions are molded and then coupled together along cooperating edges using a suitable adhesive material. The blade shell portions typically include panel walls that are made using suitable, evenly distributed fibers, fiber bundles, or mats of fibers layered in a mold part. However, the panel walls are relatively light and have only low rigidity. Therefore, a stiffness and a rigidity, as well as a buckling strength, of the panel walls may not withstand the loads and forces exerted on the rotor blade during operation. To increase the strength of the rotor blade, the blade shell portions are reinforced with sparcaps laminated to the inner surface of the blade shell portions. At least some known rotor blades include shear webs extending between the two blade shell portions connecting the sparcaps. Typically, the sparcaps and shear web extend substantially along a longitudinal length of the rotor blade.

At least some known rotor blades include blade sections that are formed from a single mold. The complete length of each blade section is formed as a unitary structure and then coupled together with a bonding material. In at least some known rotor blades, failure of the rotor blades has occurred within the bonded areas of the rotor blade. Further, with a continuously increasing length of wind turbine rotor blades in recent years, transportation and repair requirements are a major concern in the design of the rotor blade. In addition, at least some known rotor blades include a root portion that includes a circular cross-section area to facilitate connecting the rotor blade to the hub, thus reducing a length of airfoil shape along the length of the rotor blade.

BRIEF DESCRIPTION OF THE INVENTION

In one aspect, a method for assembling a rotor blade for use with a wind turbine is provided. The method includes providing a blade sidewall at least partially defining a cavity extending from a blade root towards a blade tip of the rotor blade, the blade sidewall having a leading edge and a trailing edge. A structural support assembly is positioned at least partially within the cavity and extends from the blade root towards the blade tip. The structural support assembly includes a root end and an opposing tip end. At least one support member is coupled to the blade sidewall and to the structural support assembly.

In another aspect, a rotor blade for use with a wind turbine is provided. The rotor blade includes a blade sidewall at least partially defining a cavity extending from a blade root towards a blade tip of the rotor blade. The blade sidewall has a leading edge and a trailing edge. A structural support assembly is at least partially positioned within the cavity and extending from the blade root towards the blade tip. The structural support assembly includes a root end and an opposing tip end. At least one support member is coupled between the blade sidewall and the structural support assembly.

In yet another aspect, a wind turbine is provided. The wind turbine includes a tower, a nacelle coupled to the tower, a hub rotatably coupled to the nacelle, and at least one rotor blade coupled to the hub. The rotor blade includes a blade sidewall at least partially defining a cavity extending from a blade root towards a blade tip of the rotor blade. The blade sidewall has a leading edge and a trailing edge. A structural support assembly is at least partially positioned within the cavity and extending from the blade root towards the blade tip. The structural support assembly includes a root end and an opposing tip end. At least one support member is coupled between the blade sidewall and the structural support assembly.

The embodiments described herein facilitate assembling a rotor blade that increases an annual energy production of the wind turbine and facilitates reducing the overall costs of manufacturing the rotor blade. More specifically, the rotor blade described herein includes a structural support assembly positioned within a rotor blade cavity that is coupled to a wind turbine hub to facilitate a rotor blade root portion having an airfoil shape at or near the hub of the wind turbine. In addition, by providing a structural support assembly, the rotor blade described herein may be assembled in modular sections, thereby reducing the overall costs of manufacturing the rotor blade.

DETAILED DESCRIPTION OF THE INVENTION

The embodiments described herein include a wind turbine that includes at least one rotor blade having an airfoil shape along a full length of the rotor blade to facilitate increasing an annual energy production of the wind turbine. More specifically, the rotor blade described herein includes a structural support assembly positioned within a rotor blade cavity that is coupled to a wind turbine pitch bearing to facilitate a rotor blade root portion having an airfoil shape at or near a hub of the wind turbine.

As used herein, the term "blade" is intended to be representative of any device that provides a reactive force when in motion relative to a surrounding fluid. As used herein, the term "wind turbine" is intended to be representative of any device that generates electrical power from rotational energy, and more specifically, converts kinetic energy of wind into mechanical energy and converts mechanical energy to electrical power. As used herein, the term "annual energy production" refers to the cumulative electrical energy produced by a wind turbine during a calendar year.

Figure 1:
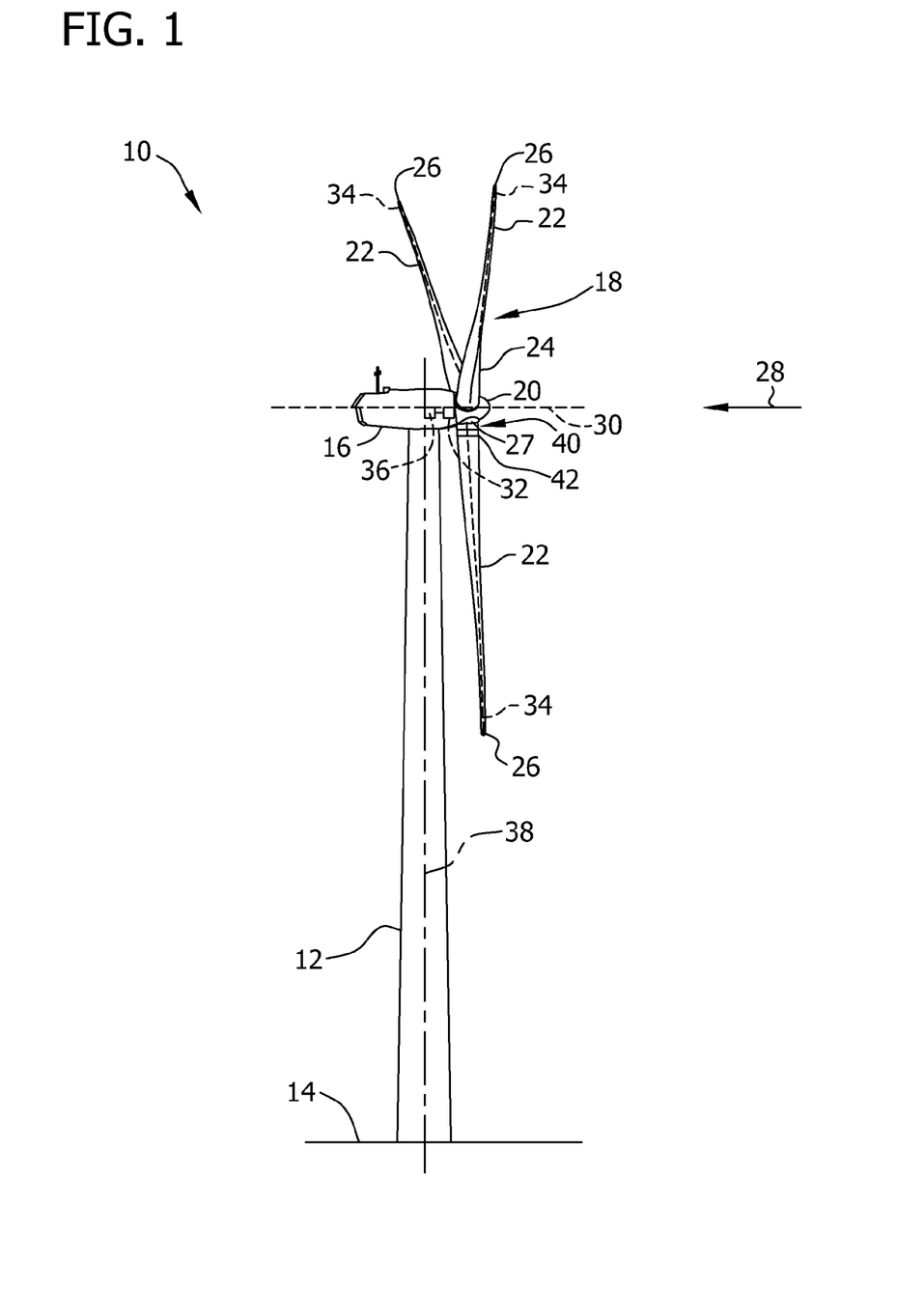
FIG. 1 is a perspective view of a portion of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 mounted on tower 12, and a rotor 18 that is rotatably coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower having any suitable height.

Rotor blades 22 are spaced about hub 20 to facilitate rotating rotor 18. Rotor blades 22 include a blade root portion 24 and a blade tip portion 26, and are mated to hub 20 by coupling blade root portion 24 to hub 20 at a plurality of load transfer regions 27. Load transfer regions 27 have a hub load transfer region and a blade load transfer region (both not shown in FIG. 1). Loads induced to rotor blades 22 are transferred to hub 20 by load transfer regions 27.

In the exemplary embodiment, rotor blades 22 have a length ranging from about 30 meters (m) (99 feet (ft)) to about 120 m (394 ft). Alternatively, rotor blades 22 may have any suitable length that enables wind turbine 10 to function as described herein. For example, other non-limiting examples of blade lengths include 10 m or less, 20 m, and 37 m, or a length that is greater than 120 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. A pitch adjustment system 32 rotates rotor blades 22 about a pitch axis 34 for adjusting an orientation of rotor blades 22 with respect to direction 28 of the wind. A speed of rotation of rotor 18 may be controlled by adjusting the orientation of at least one rotor blade 22 relative to wind vectors. In the exemplary embodiment, a pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

Wind turbine 10 also includes a pitch assembly 40 that includes a pitch bearing 42. In the exemplary embodiment, wind turbine 10 includes a corresponding pitch assembly 40 coupled to each rotor blade 22. Alternatively, wind turbine 10 includes any number of pitch assemblies 40 that correspond to the number of rotor blades 22 that enable wind turbine 10 to function as described herein. Pitch bearing 42 is coupled to hub 20 and to rotor blade 22. More specifically, pitch bearing 42 is coupled to rotor blade root portion 24. In the exemplary embodiment, pitch bearing 42 adjusts the pitch angle of rotor blade 22 by rotating rotor blade 22 about pitch axis 34.

Figure 2:
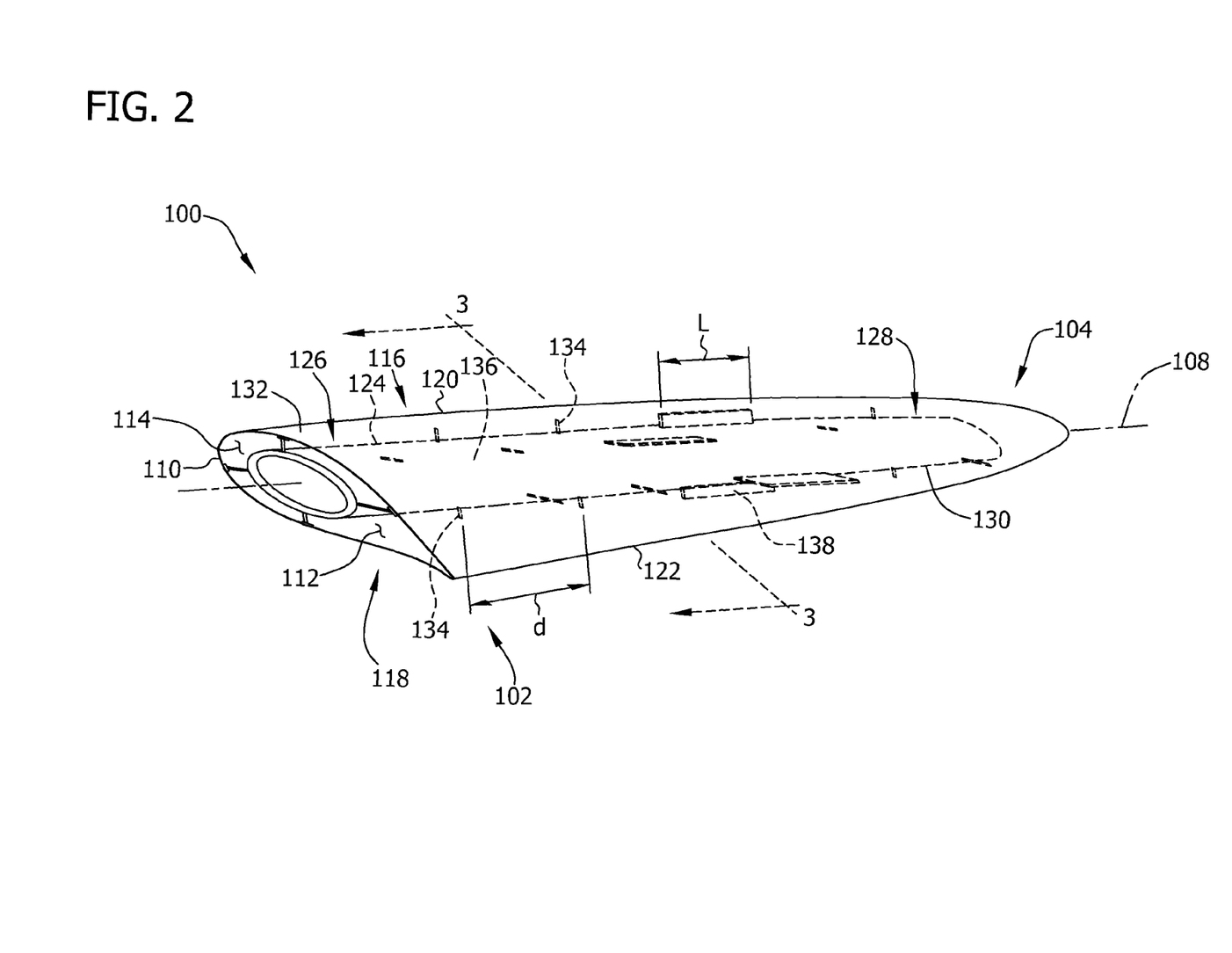
FIG. 2 is a perspective view of an exemplary rotor blade suitable for use with the wind turbine shown in FIG. 1.
Figure 3:
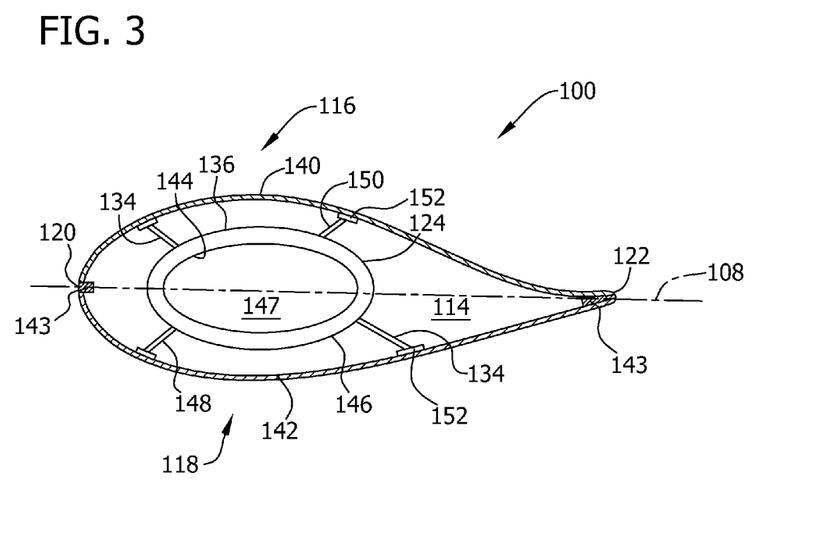
FIG. 3 is a cross-sectional view of the exemplary rotor blade shown in FIG. 2.

FIG. 2 is a perspective view of a portion of an exemplary rotor blade 100 suitable for use with wind turbine 10. FIG. 3 is a cross-sectional view of rotor blade 100 along chordwise sectional line 3-3 in FIG. 2. Identical components shown in FIG. 3 are labeled with the same reference numbers used in FIG. 2. Rotor blade 100 includes a first or root portion 102 configured to facilitate mounting rotor blade 100 to hub 20 and a second or tip portion 104 opposing root portion 102. A blade sidewall 110 of rotor blade 100 extends between root portion 102 and tip portion 104 and along a longitudinal axis 108. Blade sidewall 110 includes an inner surface 112 that at least partially defines a cavity 114 extending from root portion 102 towards tip portion 104. Blade sidewall 110 includes a first blade section 116, such as a pressure side blade section, and an opposing second blade section 118, such as a suction side blade section. Blade sidewall 110 further includes a leading edge 120 and a trailing edge 122. A structural support assembly 124 is at least partially positioned within cavity 114 and extends from root portion 102 towards tip portion 104. Structural support assembly 124 includes a root end 126, a tip end 128, and a body 130 that extends between root end 126 and tip end 128. It should be understood that tip end 128 is not necessarily positioned within tip portion 104 of rotor blade 100, but rather, is positioned nearer to tip portion 104 than structural support assembly root end 126. In the exemplary embodiment, structural support assembly 124 extends substantially the full longitudinal length of rotor blade 100. Alternatively, structural support assembly 124 extends at least partly along the longitudinal length of rotor blade 100. As used herein, the term "longitudinal length" refers to a length of rotor blade 100 along longitudinal axis 108 of rotor blade 100. In one embodiment, body 130 is substantially straight along longitudinal axis 108. In another embodiment, body 130 includes an arcuate shape with respect to longitudinal axis 108.

In one embodiment, structural support assembly 124 is configured to facilitate mounting rotor blade 100 to hub 20. More specifically, root end 126 is coupled to pitch bearing 42 (shown in FIG. 1) to support rotor blade 100. In this embodiment, blade sidewall 110 includes an outer surface 132 having an airfoil shape at root portion 102 at or near hub 20 to facilitate increasing an annual energy production of wind turbine 10 by providing a predefined aerodynamic shape at root portion 102 such that a larger blade surface area is in contact with the wind along a longitudinal length of rotor blade 100. In the exemplary embodiment, structural support assembly 124 is formed from one or more of the following materials: a fiber reinforced plastic, a glass material, a carbon material, a Kevlar material, a light weight metal such as aluminum, a hybrid composite material, and/or a metal matrix composite material and combinations thereof.

One or more support members 134 are positioned within cavity 114 and extend between structural support assembly 124 and blade sidewall 110. Support members 134 are coupled to inner surface 112 of blade sidewall 110 and to an outer surface 136 of structural support assembly 124. In the exemplary embodiment, support members 134 extend perpendicular to outer surface 136. In an alternative embodiment, support members 134 extend at any angle relative to outer surface 136 to enable rotor blade 100 to function as described herein. In one embodiment, support members 134 are spaced circumferentially about structural support assembly 124 and are positioned a distance d at least partly along the longitudinal length of structural support assembly 124. In one embodiment, at least one support member 134 includes a body 138 that extends a length L along longitudinal axis 108. In the exemplary embodiment, support members 134 are formed from one or more of the following materials: a glass material, a carbon material, a Kevlar material, a light weight metal such as aluminum, a hybrid composite material, and/or a metal matrix composite material and combinations thereof.

During operation of wind turbine 10, as wind strikes rotor blades 22 from a direction 28, an aerodynamic load is imparted on blade sidewall 110 to cause rotation of rotor 18. Support members 134 transfer such aerodynamic loads from blade sidewall 110 to structural support assembly 124 to facilitate reducing bending moments and tip deflection of rotor blade 100.

Referring to FIG. 3, in the exemplary embodiment, blade sidewall 110 includes a first or pressure panel wall 140 and a cooperating second or suction panel wall 142. Suction panel wall 142 is coupled to pressure panel wall 140 along leading edge 120 and along trailing edge 122 with a bonding material 143 to form rotor blade 100 and to define cavity 114 therebetween. In the exemplary embodiment, bonding material 143 is a bonding paste, however, it should be understood that bonding material 143 may be one of a fastener, a flange, and/or any other suitable coupling mechanism to enable rotor blade 100 to function as described herein. Structural support assembly 124 is positioned within cavity 114. In the exemplary embodiment, structural support assembly 124 includes a support wall 146 having an inner surface 144 and outer surface 136. In the exemplary embodiment, structural support assembly 124 includes a substantially elliptical cross-section shape with inner surface 144 defining a cavity 147. In an alternative embodiment, structural support assembly 124 includes any suitable cross-sectional shape, length, and/or dimensions that enables rotor blade 100 to function as described herein.

Support members 134 include at least one of a first or suction panel support member 148 and a second or pressure panel support member 150. First support member 148 is coupled to and extends between suction panel wall 142 and structural support assembly 124. Second support member 150 is coupled to and extends between pressure panel wall 140 and structural support assembly 124. In the exemplary embodiment, support members 134 are coupled to blade sidewall inner surface 112 and to structural support assembly 124 with a suitable bonding material 152. In the exemplary embodiment, bonding material 152 is a bonding paste. In an alternative embodiment, support members 134 are coupled to blade sidewall inner surface 112 and to structural support assembly 124 using one of a fastener, a flange, and/or any other suitable coupling mechanism to enable rotor blade 100 to function as described herein.

Figure 4:
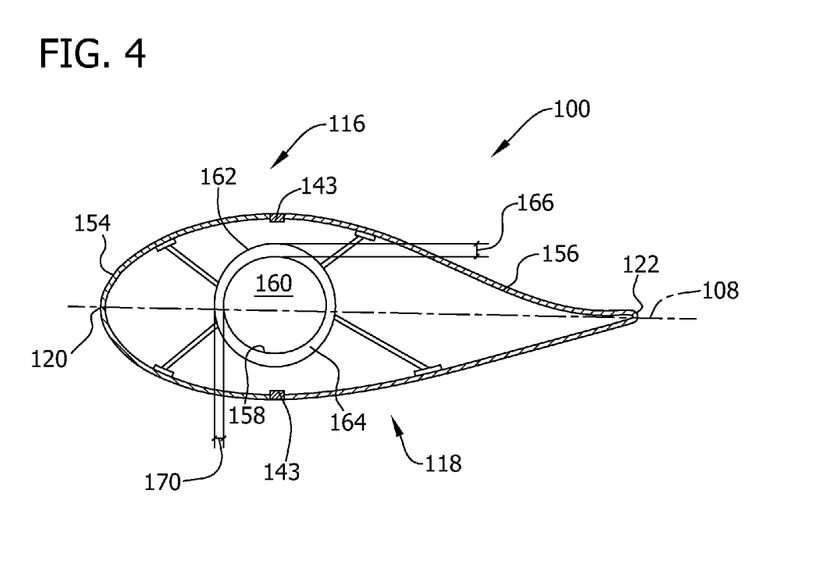
FIGS. 4-7 are cross-sectional views of alternative embodiments of rotor blades suitable for use with the wind turbine shown in FIG. 1.

FIGS. 4-7 are cross-sectional views of alternative embodiments of rotor blade 100. Identical components shown in FIGS. 4-7 are labeled with the same reference numbers used in FIG. 3. Referring to FIG. 4, blade sidewall 110 includes a forward panel wall 154 and an aft panel wall 156. Forward panel wall 154 is coupled to aft panel wall 156 with bonding material 143 at least one location positioned between leading edge 120 and trailing edge 122 to form rotor blade 100. Forward panel wall 154 includes leading edge 120. Aft panel wall 156 includes trailing edge 122. In this alternative embodiment, structural support assembly 124 includes a support wall having an inner surface 158 and an outer surface 162. Inner surface defines a cavity 160. Outer surface 162 includes a substantially circular shape. Support wall 164 includes a first cross-section thickness 166 and a second cross-section thickness 170, wherein the second cross-section thickness 170 is different than the first cross-section thickness 166.

Figure 5:
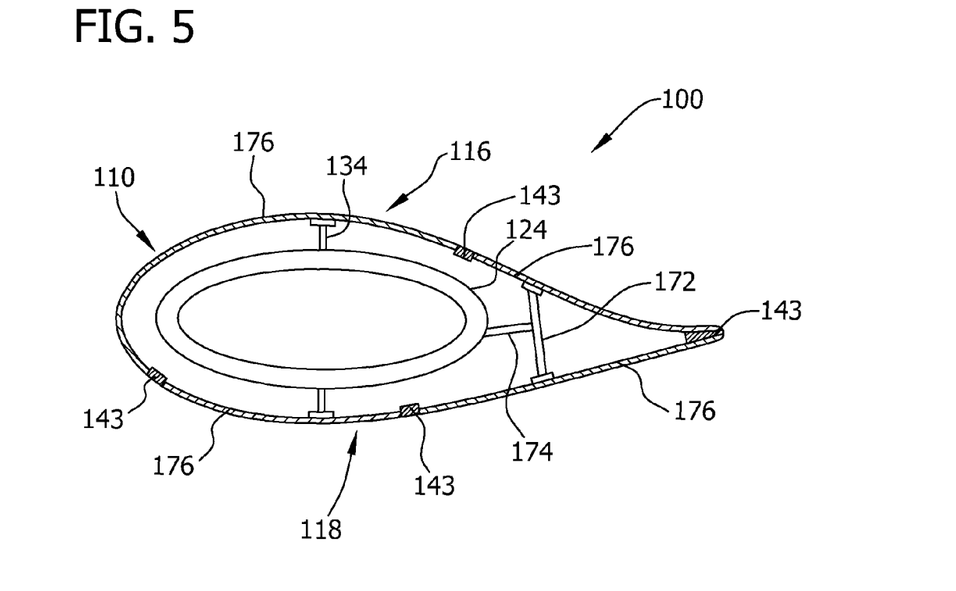

Referring to FIG. 5, in a further alternative embodiment, a third support member 172 is coupled to and extends between pressure side blade section 116 and suction side blade section 118. A fourth support member 174 is coupled to third support member 172 and to structural support assembly 124. In this alternative embodiment, blade sidewall 110 includes a plurality of panel walls 176 coupled together at any suitable location with bonding material 143 to form rotor blade 100.

Figure 6:
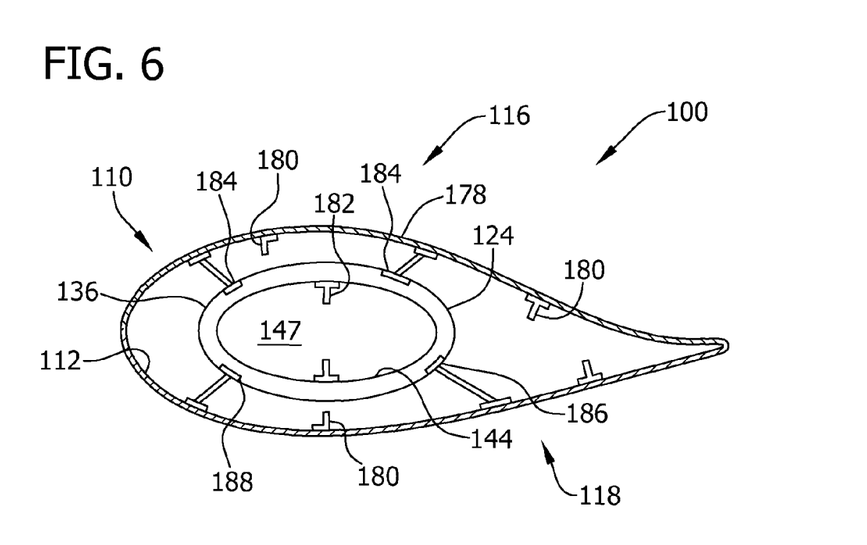

Referring to FIG. 6, in a further alternative embodiment, blade sidewall 110 is formed as a unitary member 178. One or more first stiffening members 180 are each coupled to inner surface 112 of blade sidewall 110 to facilitate increasing a bucking strength of rotor blade 100. In one embodiment, one or more stiffening member 180 has an L-shaped cross-section. In another embodiment, one or more stiffening members 180 has a T-shaped cross-section. In a further embodiment, stiffening members 180 may have any suitable shape that enables rotor blade 100 to function as described herein. In this alternative embodiment, structural support assembly 124 includes at least one second stiffening member 182 positioned within cavity 147 and coupled to inner surface 144 to facilitate increasing a bucking strength of structural support assembly 124. Second stiffening member 182 has one of a T-shaped, L-shaped, or any suitable cross-section shape to enable structural support assembly 124 to function as described herein. In one embodiment, structural support assembly 124 includes a plurality of slots 184 defined within outer surface 136 to facilitate coupling support member 134 to structural support assembly 124. In another embodiment, support members 134 are coupled to structural support assembly 124 with a plurality of flanges 186 and/or bonding material 188.

Figure 7:
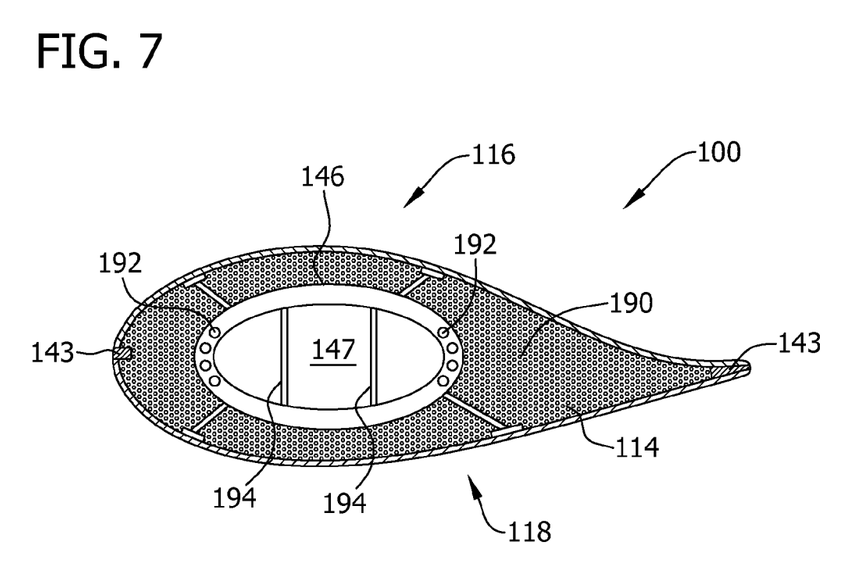

Referring to FIG. 7, in a further alternative embodiment, rotor blade 100 includes a low density material 190, such as a foam to facilitate increasing a bucking strength of rotor blade 100. Low density material 190 is positioned within cavity 114 and extends at least partially from blade root portion 102 towards blade tip portion 104. Structural support assembly 124 includes a plurality of openings 192 defined within support wall 146 of structural support assembly 124. Openings 192 extend at least partially from root end 126 to tip end 128 of structural support assembly 124. One or more shear webs 194 are positioned within cavity 147 and coupled to inner surface 144.

Figure 8:
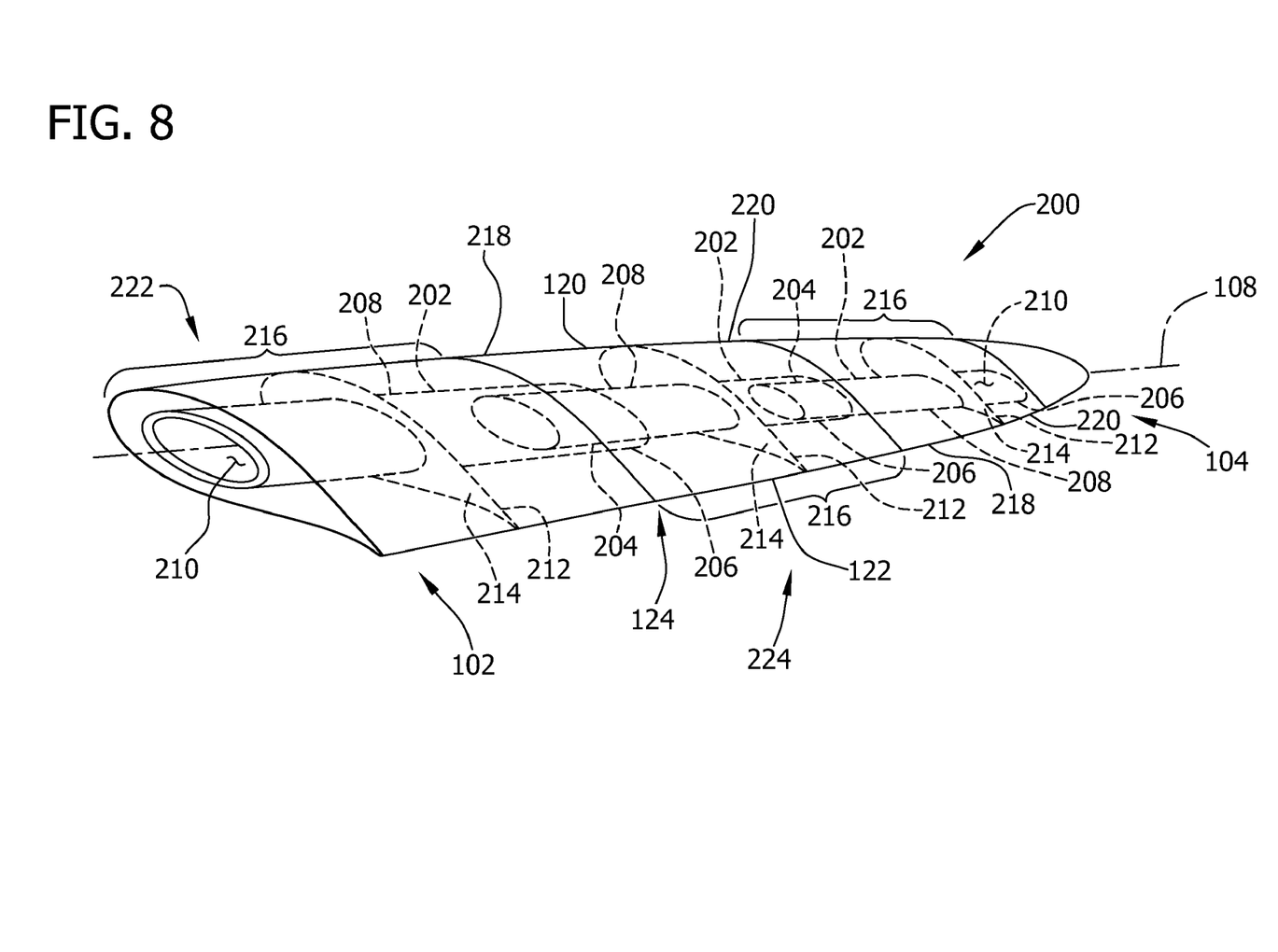
FIG. 8 is a perspective view of a portion of an alternative rotor blade suitable for use with the wind turbine shown in FIG. 1.

FIG. 8 is a perspective view of an alternative rotor blade 200. Identical components shown in FIG. 8 are labeled with the same reference numbers used in FIG. 2. In this alternative embodiment, structural support assembly 124 includes a plurality of structural support members 202 extending substantially along the full longitudinal length of rotor blade 200. Each structural support member 202 has a root end 204, a tip end 206, and a support wall 208 extending between root end 204 and tip end 206. Each structural support member 202 defines a cavity 210 extending between root end 204 and tip end 206. In this embodiment, tip end 206 is sized to receive a root end 204 of an adjacent structural support member 202, such that root end 204 is positioned at least partially within cavity 210 at tip end 206 of adjacent structural support member 202. Structural support members 202 are coupled together to form structural support assembly 124 extending from blade root portion 102 towards blade tip portion 104 along longitudinal axis 108. In this alternative embodiment, rotor blade 200 includes a plurality of support members 212 each including a support body 214 extending between leading edge 120 and trailing edge 122. Support member 212 is coupled to structural support assembly 124 and to blade sidewall 110. Rotor blade 200 further includes a plurality of blade sidewall sections 216 that extend between blade root portion 102 and blade tip portion 104. Each blade sidewall section 216 includes a root portion 218 and a tip portion 220. Blade sidewall section 216 is coupled to an adjacent blade sidewall section 216 along longitudinal axis 108 such that root portion 218 of a first blade sidewall section 222 is coupled to a corresponding tip portion 220 of an adjacent second blade sidewall section 224.

Figure 9:
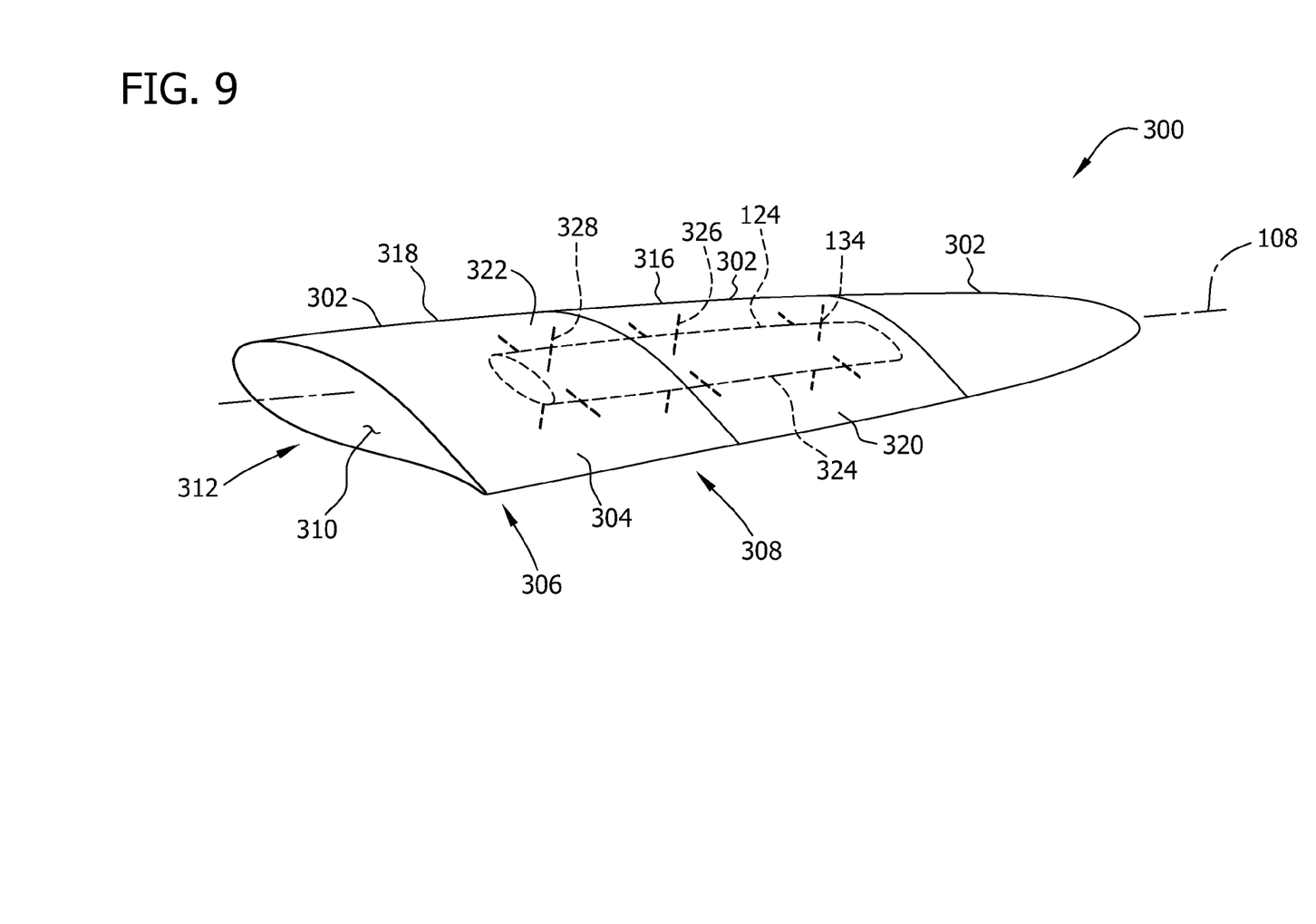
FIG. 9 is a perspective view of a portion of a further alternative rotor blade suitable for use with the wind turbine shown in FIG. 1.

FIG. 9 is a perspective view of an alternative rotor blade 300. Identical components shown in FIG. 9 are labeled with the same reference numbers used in FIG. 2. In this alternative embodiment, rotor blade 300 includes a plurality of blade sections 302 that are coupled together to form rotor blade 300. Each blade section 302 includes a blade sidewall 304 that has a root portion 306 and a tip portion 308. Blade sidewall 304 has an inner surface 310 that defines a cavity 312. At least one blade section 314 includes structural support assembly 124 and one or more support members 134. Structural support assembly 124 is positioned within cavity 312. Support members 134 are positioned within cavity 312 and extend between structural support assembly 124 and blade sidewall 304. In one embodiment, rotor blade 300 includes a first blade section 316 and a second blade section 318. First blade section 316 includes a first blade sidewall 320 and second blade section 318 includes a second blade sidewall 322. A structural support assembly 324 is positioned within first blade section 316 and extends from first blade section 316 to second blade section 318 such that structural support assembly 324 is positioned at least partially within cavity 312 of second blade section 318. One or more first support members 326 extend between first blade sidewall 320 and structural support assembly 324. One or more second support members 328 extend between second blade sidewall 322 and structural support assembly 324.

The above-described systems and methods facilitate assembling a rotor blade that includes an airfoil shape along the full length of the rotor blade to facilitate increasing an annual energy production of the wind turbine. More specifically the rotor blade described herein includes a structural support assembly positioned within a rotor blade cavity that is coupled to a wind turbine pitch bearing to facilitate a rotor blade root portion having an airfoil shape at or near a hub of the wind turbine. In addition, by providing a structural support assembly, a rotor blade may be assembled in modular sections, thereby reducing the overall costs of manufacturing the rotor blade. As such, the cost of assembling a wind turbine is significantly reduced.

Exemplary embodiments of a rotor blade for use with a wind turbine and method for assembling the rotor blade are described above in detail. The systems and methods are not limited to the specific embodiments described herein, but rather, components of systems and/or steps of the methods may be utilized independently and separately from other components and/or steps described herein. For example, the methods may also be used in combination with other rotor blade systems and methods, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for assembling a rotor blade for a wind turbine, the method comprising:

coupling a first blade section to a second blade section to form the rotor blade, the rotor blade including a blade sidewall at least partially defining a cavity extending from a blade root towards a blade tip of the rotor blade, the blade sidewall having a leading edge and a trailing edge;

positioning a structural support assembly at least partially within the cavity and extending from the blade root towards the blade tip, the structural support assembly having an inner surface and an outer surface, the inner surface defining a cavity extending between a root end and an opposing tip end;

coupling a plurality of support members between the blade sidewall and the structural support assembly such that the plurality of support members are spaced circumferentially about the structural support assembly outer surface;

coupling a first support member of the plurality of support members between the first blade section and the second blade section; and, coupling a second support member of the plurality of support members between the first support member and the structural support assembly.

2. A method in accordance with claim 1, further comprising coupling a plurality of stiffening members to an inner surface of the blade sidewall.

3. A method in accordance with claim 1, further comprising:
coupling a first support section to a second support section to form the structural support assembly; and,
coupling at least one shear web to the first support section and to the second support section, wherein the shear web is positioned within the structural support assembly cavity.

4. A method in accordance with claim 1, further comprising at least partially filling the blade sidewall cavity with a low-density material.

5. A method in accordance with claim 1, further comprising:
providing at least one of a first structural support member and a second structural support member, each of the first structural support member and the second structural support member having a root end and an opposing tip end, and defining a cavity from the root end to the tip end; and,
coupling the first structural support member to the second structural support member, wherein the at least a portion of the root end of the second structural support member is inserted into the tip end of the first structural support member to form the structural support assembly.

6. A rotor blade for use with a wind turbine, the rotor blade comprising:
a blade sidewall comprising a first blade section and a second blade section coupled to said first blade section to form said rotor blade, said blade sidewall at least partially defining a cavity extending from a blade root towards a blade tip of said rotor blade, said blade sidewall having a leading edge and a trailing edge;
a structural support assembly at least partially positioned within the cavity and extending from said blade root towards said blade tip, said structural support assembly comprising an inner surface and an outer surface, said inner surface defining a cavity extending between a root end and an opposing tip end; and,
a plurality of support members coupled between said blade sidewall and said structural support assembly, said plurality of support members spaced circumferentially about said outer surface, said plurality of support members comprising a first support member and a second support member, said first support member coupled between said first blade section and said second blade section, said second support member coupled between said first support member and said structural support assembly.

7. A rotor blade in accordance with claim 6, further comprising at least one stiffening member coupled to an inner surface of said blade sidewall.

8. A rotor blade in accordance with claim 6, wherein said structural support assembly comprises a first support section coupled to a second support section to form said structural support assembly, and at least one shear web positioned within said structural support assembly cavity and coupled to said first support section and to said second support section.

9. A rotor blade in accordance with claim 6, wherein said structural support assembly comprises a sidewall and at least one opening defined within said sidewall, and said opening extends along a longitudinal length of said structural support assembly.

10. A rotor blade in accordance with claim 6, wherein said cavity is at least partially filled with a low-density material.

11. A rotor blade in accordance with claim 6, wherein said structural support assembly comprises a plurality of structural support members each having a root end and an opposing tip end, and defining a cavity from said root end to said tip end, at least a portion of said root end of a first structural support member is inserted into said cavity defined by said tip end of an adjacent structural support member to form said structural support assembly.

12. A rotor blade in accordance with claim 6, wherein said structural support assembly further comprises a plurality of stiffening members coupled to said inner surface.

13. A rotor blade in accordance with claim 6, further comprising a plurality of blade sections coupled together to form said rotor blade, each blade section of said plurality of blade sections comprising a blade sidewall at least partially defining a cavity extending from a root portion towards a tip portion of said blade section, wherein said structural support assembly is at least partially positioned within the cavity defined by at least one blade section of said plurality of blade sections, each support member of said plurality of support members coupled between said blade sidewall and said structural support assembly.

14. A wind turbine, comprising:
a tower;
a nacelle coupled to said tower;
a hub rotatably coupled to said nacelle; and,
at least one rotor blade coupled to said hub, said rotor blade comprising:
a blade sidewall at least partially defining a cavity extending from a blade root towards a blade tip of said rotor blade, said blade sidewall having a leading edge and a trailing edge;
a structural support assembly at least partially positioned within the cavity and extending from said blade root towards said blade tip, said structural support assembly comprising an inner surface and an outer surface, said inner surface defining a cavity extending between a root end and an opposing tip end; and,
a plurality of support members coupled between said blade sidewall and said structural support assembly, said plurality of support members spaced circumferentially about said outer surface.

15. A wind turbine in accordance with claim 14, wherein said rotor blade further comprises at least one stiffening member coupled to an inner surface of said blade sidewall.

16. A wind turbine in accordance with claim 14, wherein said structural support assembly comprises a first support section coupled to a second support section to form said structural support assembly, and at least one shear web positioned within said structural support assembly cavity and coupled to said first support section and to said second support section.

17. A wind turbine in accordance with claim 14, wherein said structural support assembly comprises a sidewall and at least one opening defined within said sidewall, and said opening extends along a longitudinal length of said structural support assembly.

18. A wind turbine in accordance with claim 14, wherein said structural support assembly comprises a plurality of structural support members each having a root end and an opposing tip end, and defining a cavity from said root end to said tip end, at least a portion of said root end of a first structural support member is inserted into said cavity defined by said tip end of an adjacent structural support member to form said structural support assembly.

* * * * *